United States Patent [19]
Crispin et al.

[11] 3,822,762
[45] July 9, 1974

[54] DECORATIVE ACOUSTIC PANEL

[75] Inventors: Thayer S. Crispin, Newport Beach; Fred E. Duskin, Garden Grove, both of Calif.

[73] Assignee: McDonnell Douglas Corporation, Santa Monica, Calif.

[22] Filed: Sept. 23, 1971

[21] Appl. No.: 183,161

[52] U.S. Cl................. 181/33, 161/68, 161/43, 161/89, 161/93
[51] Int. Cl.............................................. B23b 3/12
[58] Field of Search............ 161/41, 43, 68, 69, 90, 161/127, 93; 156/197; 181/33 R, 33 G; 52/144, 145

[56] References Cited
UNITED STATES PATENTS

| | | | |
|---|---|---|---|
| 2,870,857 | 1/1959 | Goldstein | 181/33 R |
| 3,095,943 | 7/1963 | Kemp | 161/43 |
| 3,166,149 | 1/1965 | Hulse et al. | 161/68 X |
| 3,211,253 | 10/1965 | Gonzalez | 161/68 |
| 3,622,430 | 11/1971 | Jurisich | 161/68 |

*Primary Examiner*—George F. Lesmes
*Assistant Examiner*—Paul J. Thibodeau
*Attorney, Agent, or Firm*—Robert O. Richardson; Walter J. Jason; Donald L. Royer

[57] ABSTRACT

An acoustic panel having a honeycomb core with edge members for mounting. A second honeycomb material over the first and the edge members spaces them from the decorative face sheet to prevent undesirable surface imperfections called markoff from appearing on the face sheet.

5 Claims, 3 Drawing Figures

DECORATIVE ACOUSTIC PANEL

BACKGROUND OF THE INVENTION

It is desirable to have a lightweight, rugged, low cost, easy to manufacture, aesthetic acoustical panel lining for an aircraft cabin.

Acoustic panels typically consist of a honeycomb core material between a backing sheet and a cover sheet, at least one of which permits the passage of sound waves therethrough into the inner cellular structure where the wave energy is absorbed and the sound waves suppressed. The provision of randomly oriented fibers within the inner core structure enhances the acoustic properties of the panel. These panels require edge members and internal blocking of solid material for reinforcement, selected vibration suppression and for mounting of the panel onto a support structure. Even though a decorative cover sheet is then applied, undesirable surface imperfections called markoff will appear through the cover sheet at the points of juncture between the honeycomb core and the edge members and internal blocking members.

SUMMARY OF THE PRESENT INVENTION

The problem of markoff is avoided in the present invention through the use of a second layer of honeycomb material bonded to the first and also extending over the edge members and internal blocking members to present a unitary homogenous surface upon which a face sheet of decorative material may then be applied. The honeycomb-to-honeycomb bond, in one embodiment, is accomplished without an intermediate membrane to thereby improve the acoustic properties of the panel.

DETAILED DESCRIPTION OF ILLUSTRATIVE EMBODIMENTS

Figure 1:
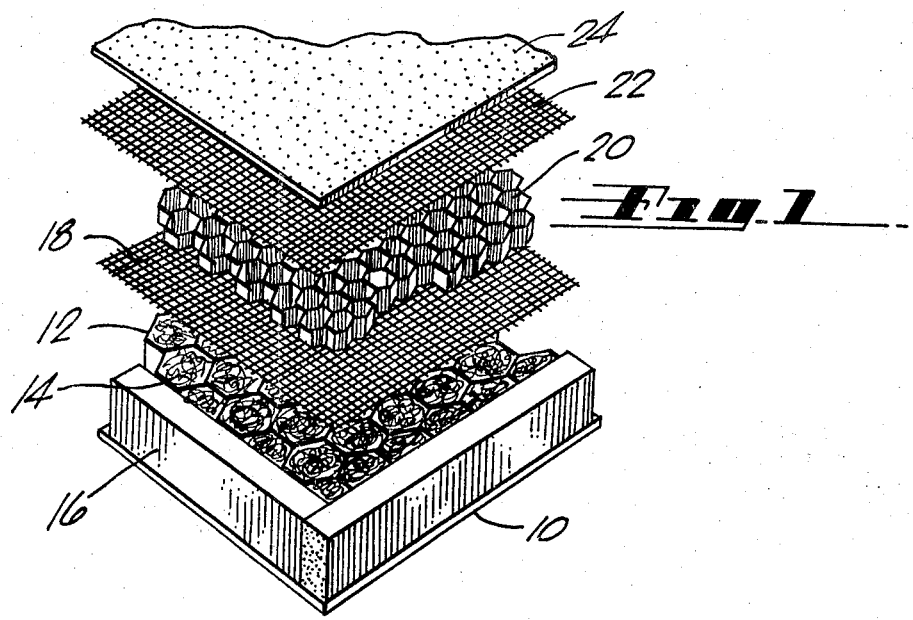
FIG. 1 is an exploded view in perspective showing the various layers of material comprising the acoustic panel.

Reference is now made to FIG. 1 wherein there is shown a base sheet 10 of heavy fiberglass backing material to serve as an acoustic transmission barrier. Positioned on the base is a large cell honeycomb core material 12 filled with a fiberglass batting 14 for sound absorption purposes. Typically, the honeycomb is of .003 inch thickness and the cells are typically 3/8 inch wide and 3/8 inch thick. It may be of aluminum, nomex, paper or other material commonly in use. The fiberglass may be blown into the cells or if the fiberglass is of a batting composition, it may be pushed or rolled under pressure with the sharp edges of the aluminum causing the separation.

Placed about the periphery is a polyurethane edge strip 16 through which suitable fastening means may be used in the insulation of the panel where desired. Mounted over the honeycomb core material 12 and the edge strip 16 is an open weave fiberglass facing 18 resembling a flyscreen in appearance. Over this flyscreen is mounted a small cell honeycomb material, typically of 1/8 inch thickness and having a 1/8 inch size cell. This flyscreen serves as a membrane between the two layers for bonding purposes. Over the spacing layer of honeycomb material 20 is another flyscreen 22 which serves as a backing for a perforated, decorative covering 24 which serves as the outer side of the panel and is decorative for appearance.

Figure 2:
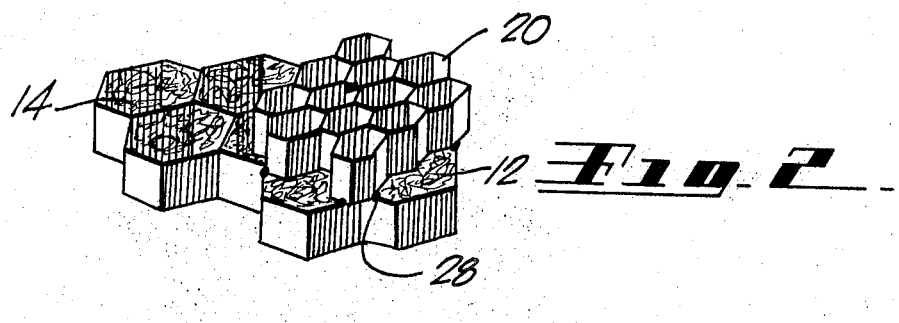
FIG. 2 is an enlarged perspective view showing the bonding of two layers of honeycomb without an intermediate membrane.

In FIG. 2 there is shown in perspective an enlarged portion of the honeycomb core material 12 bonded to the spacing layer of honeycomb material 20 without the intermediate flyscreen membrane 18 shown in FIG. 1. By simply applying an adhesive to the edges of the abutting layers, intermittent bonding 28 occurs at those points where the edges of one layer abut the edges of the other. This intermittent bonding has proven to be sufficiently strong and is quite acceptable in the fabrication of acoustic panels, especially in the bonding together of layers of cellular core material having cells of different sizes. The absence of a membrane, even a porous flyscreen, allows sound to pass through the first layer of honeycomb and into the second layer with no restriction and thus provides superior acoustic properties.

Figure 3:
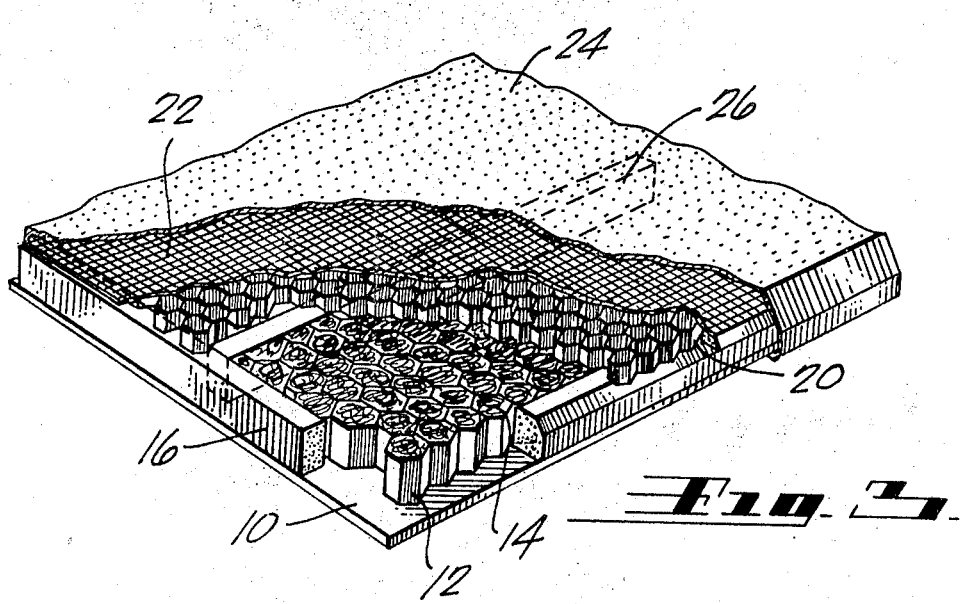
FIG. 3 is a perspective view of the panel with portions removed to show the inner construction of a double core acoustic panel.

Referring now to FIG. 3 there is shown, assembled and bonded together, the various layers of materials shown in FIG. 1 with the exception of the flyscreen 18 between the honeycomb core 12 and the spacing layer of honeycomb material 20. An internal blocking member 26 of any suitable material such as wood, metal or plastic, for example, has been added for selected vibration suppression and for structural rigidity. It should be noted that the spacing layer of honeycomb material 20 and the flyscreen facing 22 not only are bonded to the honeycomb core 12 but also are bonded to the edge strips 16 and blocking members 26 to present an integral smooth surface for the decorative covering.

Having thus described an illustrative embodiment of the present invention, it is to be understood that modifications and variations thereof will become apparent to those skilled in the art and it is to be understood that these deviations are to be considered as part of the present invention.

We claim:

1. A decorative acoustic panel comprising:
    a backing sheet,
    a honeycomb core material having randomly oriented glass fibers within the cells thereof,
    said core being affixed to a surface of said backing sheet,
    a honeycomb spacing material positioned over and affixed to said core and defining a substantially acoustical transparent interface, said cellular spacing material providing a unitary homogenous surface,
    an open weave fiberglass facing positioned over and affixed to said spacing material, and
    a decorative sound transmitting perforate face sheet over said surface.

2. A decorative acoustic panel as in claim 1 wherein an open weave fiberglass facing is positioned between and bonded to said core material and said spacing material.

3. A decorative acoustic panel as in claim 1 wherein internal blocking members are also affixed to a surface of said backing sheet.

4. A decorative acoustic panel as in claim 1 wherein the cells of said core material are relatively larger in thickness and size than the cells of said spacing material and wherein the abutting edges are bonded at points of contact of said materials.

5. A decorative acoustic panel as in claim 1 wherein blocking strips of substantially the same thickness as said core are affixed to said backing sheet by which said panel may be mounted, said honeycomb spacing material being positioned over and affixed to said strips.

* * * * *